United States Patent
Robinson et al.

[15] 3,638,694
[45] Feb. 1, 1972

[54] PUSH ARM

[72] Inventors: Ramon H. Robinson, Dallas; Charles A. Ramsel, Giddings; Charles A. Deckert, Deer Park, all of Tex.

[73] Assignee: Youngstown Sheet and Tube Company, Youngstown, Ohio

[22] Filed: Mar. 20, 1970

[21] Appl. No.: 21,381

[52] U.S. Cl. .................................144/34 A, 144/34 E
[51] Int. Cl. ...........................................A01g 23/02
[58] Field of Search ..................144/34 R, 34 A–34 E, 144/309 AC

[56] References Cited

FOREIGN PATENTS OR APPLICATIONS 848,216   8/1970   Canada.................................144/34 A

*Primary Examiner*—Gerald A. Dost
*Attorney*—J. Vincent Martin, Joe E. Edwards, M. H. Gay, Alfred H. Evans and Jack R. Springgate

[57] ABSTRACT

A shear for timber harvesting having a push arm for pushing the tree being felled in the desired direction during the shearing operation.

3 Claims, 4 Drawing Figures

PATENTED FEB 1 1972  3,638,694
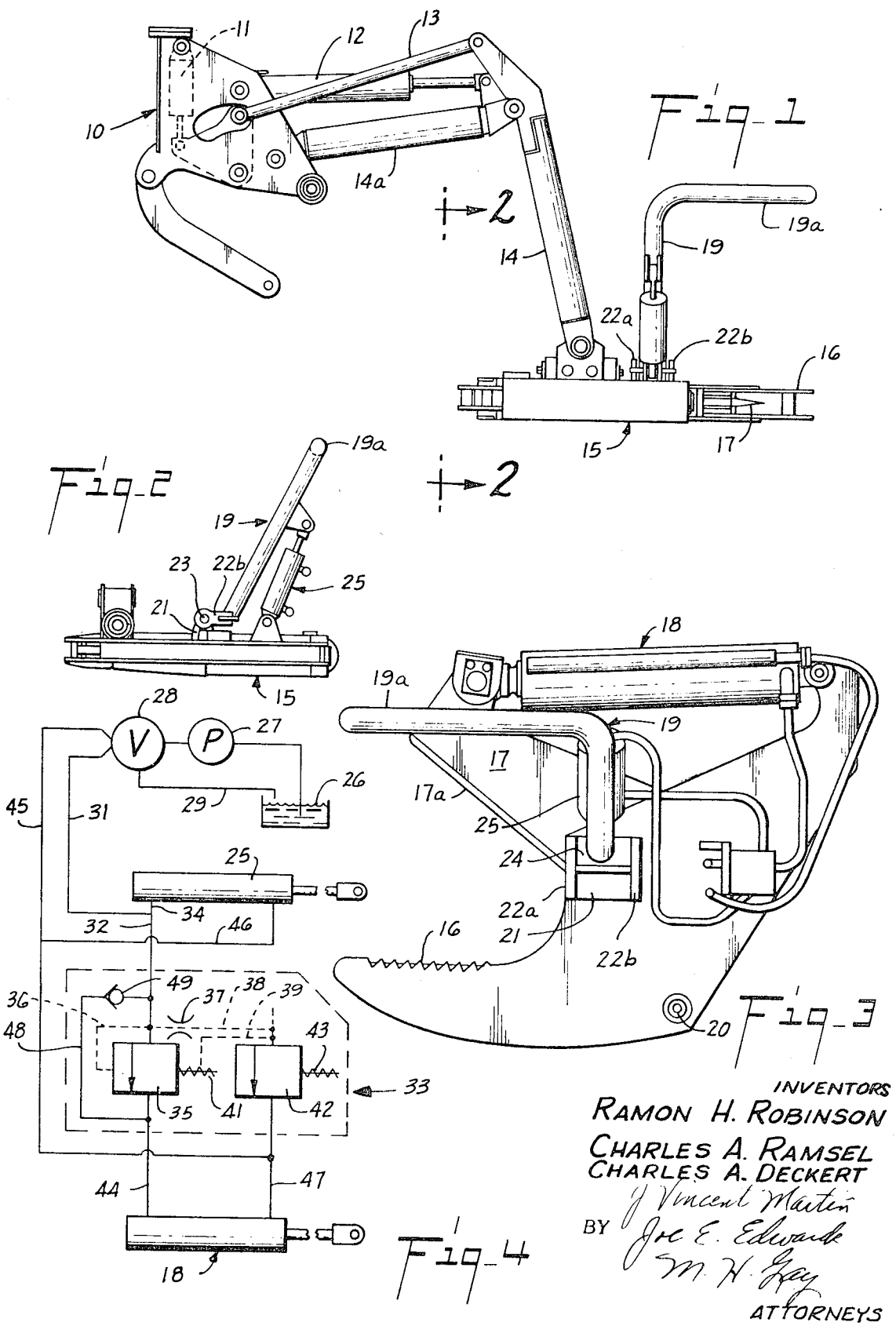
INVENTORS
RAMON H. ROBINSON
CHARLES A. RAMSEL
CHARLES A. DECKERT
BY J Vincent Martin
   Joe E. Edwards
   M. H. Gay
   ATTORNEYS

PUSH ARM

In the handling of trees by tree processing machinery, it is desirable to control the direction of fall of a tree during the felling operation. For instance, in the type of machine shown in the U.S. Pat. to Bush No. 3,059,677, the tree should be felled in a forward direction so that it will land on the catch-arm which is then lifted to move the tree into processing position. The shear blade of the conventional shear is normally of substantial thickness with a bevel cutting surface. As the blade moves into the tree, this bevel tilts the tree towards the anvil of the shear and this tilting action is normally sufficient to cause the tree to be felled in the desired direction, that is, toward the anvil.

In some instances, the bevel on the shear blade is not effective to control the direction of fall of the tree. For instance, where a large shear is used to fell small tress the shear moves through the tree so rapidly that the tree is completely severed before a significant tilting of the tree has occurred. In this instance, the tree may fall in a random direction. This is undesirable as the tree may fall against the tree-harvesting device or if a harvester of the type disclosed in said Bush patent is utilized, the tree may not land on the catch-arm in a position to be further processed.

It is an object of this invention to provide a tree harvesting apparatus in which a tree when felled is positively forced to fall in the desired direction.

Another object is to provide a tree-harvesting apparatus consisting of a fell shear and an associated apparatus for force a tree to fall in a desired direction as it is felled.

Another object is to provide a tree-harvesting apparatus including a fell shear and an apparatus for bearing against the three prior to the time that the fell shear is energized and which bears against the tree during the time that the fell shear is energized to force the tree to fall in the desired direction.

Other objects, features and advantages of this invention will be apparent from the drawings, the specification and the claims.

In the drawings wherein an illustrative embodiment of this invention is shown and wherein like reference numerals indicate like parts;

FIG. 1 is a view in vertical elevation of the fell shear and pusher apparatus of this invention together with a mounting system for mounting the apparatus on a vehicle;

FIG. 2 is a view in elevation along the lines 2–2 of FIG. 1 with the supporting arm omitted;

FIG. 3 is a plan view of the shear and pusher apparatus; and

FIG. 4 is a flow diagram illustrating the control means for operating the shear and tree pusher.

The timber-harvesting apparatus of this invention may be utilized with any desired vehicle such as the timber harvester illustrated in Busch U.S. Pat. No. 3,059,677, issued Oct. 23, 1962. Reference is made to said Busch patent for a detailed description of a shear of the type shown in this application and of a form of mounting assembly for mounting the shear on a vehicle.

The mounting assembly illustrated includes a bracket 10 which carries a pair of cylinders 11 and 12 as well as a linkage arm 13 for positioning the support arms 14 and 14a which in turn carry the fell shear indicated generally at 15. As explained in the Busch Patent, the mounting system permits the operator to position the shear about a tree to be felled at the base of the tree.

The shear 15 includes an anvil 16 which normally extends in a straight line and when used with a tree harvester such as shown in the Busch Patent the anvil 16 will extend in a plane normal to the length dimension of the tree harvester.

The shear blade 17 is hinge mounted about a hinge 20 for swinging movement toward said anvil 16 to fell a tree positioned against the anvil 16. It will be noted that the blade 17 is beveled as at 17a. This beveled surface will tend to tilt the tree toward the anvil 16 or in a plane normal to the plane of the anvil 16 to fell the tree over the anvil 16.

A suitable hydraulic motor indicated generally at 18 is carried by the shear and attached to the shear blade 17 for swinging the blade 17 toward and away from the anvil 16.

A push arm indicated generally at 19 and having a striking section 19a for engaging a tree extending through the shear is hinge mounted on the shear. A bearing 21 is mounted on the shear. A pair of hinges 22a and 22b are secured to hinge pin 23 which extends through the bearing 21. These hinges 22a and 22b are in turn secured to a crossmember 24 which supports the push arm 19. It will be noted that the bearing 21 extends approximately parallel to the plane of the anvil 16 and thus the push arm will move toward and away from the anvil 16 in a plane generally normal to the plane of the anvil.

In order to forcefully urge the push arm toward and away from the tree, a suitable hydraulic motor 25 is connected between the shear and the push arm. Upon extension of the motor 25 the push arm is urged against a tree being felled.

In accordance with this invention, the push arm and the shear blade are simultaneously urged against the tree so that as the tree is severed, the push arm will urge the tree in a direction to fall across the anvil 16. Preferably, the control system is such that the push arm first exerts a pressure against the tree to insure that it is being urged in a proper direction before the blade 17 is energized. Then upon energization of the blade 17, the push arm and blade are simultaneously urged against the tree to sever the tree and force it to fall in the desired direction.

Reference is now made to FIG. 4 wherein a preferred form of control system is shown for the apparatus. This control system first pressurizes the push arm motor with a selected pressure and then pressurizes both motors simultaneously to push the tree toward the anvil and move the blade through the tree to fell the tree in a plane normal to the plane of the anvil.

Hydraulic fluid is drawn from sump 26 through pump 27. This fluid passes through the four-way valve 28 to the apparatus. Fluid returning from the apparatus passes through the four-way valve 28 and line 29 to the sump. If the valve 28 is turned to a position to fell a tree, fluid under pressure passes through line 31 and 32 to a sequence valve indicated generally at 33. Through a branch conduit 34, fluid under pressure is introduced into motor 25 to initially urge the push arm 19 against the tree with a selected force. This force will depend upon the force developed by pump 27 and upon the pressure developed prior to operation of the sequence valve.

Fluid pressure from line 32 passes into valve 35 through control line 36. This pressure tends to urge valve 35 toward open position. Fluid under pressure also passes through the restricted orifice 37 to lines 38 and line 39 which leads to valve 35. This pressure is exerted across a pressure responsive area in the valve 35 which is substantially equal and opposite to the area exposed to fluid pressure from line 36. A resilient member 41 urges the valve 35 to remain in closed position. As the pressure is equal and opposite, the valve will initially remain closed. The pressure fluid from line 38 also is exerted on a pressure responsive member in the valve 42 tending to open this valve. This action is opposed by the resilient member 43. As pressure builds up in valve 42, it overcomes the force of spring 43 and opens the valve 42. When valve 42 opens, this permits pressure to bleed out of lines 38 and 39 downstream of the orifice 37 to relieve the pressure on valve 35 tending to maintain it in closed position. When this happens the pressure in line 36 opens valve 35 and fluid pressure may then pass through conduit 44 to the motor 18 for closing the shear blade 17. It will be appreciated that during the time necessary for the sequence valve to operate and open valve 35, pressure has been building up in the push arm motor 25 to a desired pressure to exert a considerable force on the tree urging it toward the anvil 16. Upon opening of valve 35 the blade 17 is actuated and the hydraulic fluid is then urging the push arm toward the tree and the blade to pass through the tree to thus fell the tree and cause it to fall across the anvil 16.

Upon felling of the tree, the valve 28 is reversed and fluid pressure is introduced through line 45 into the system. This pressure passes through line 46 to the rod end of motor 25 to retract the push arm. This pressure also passes through line 47 to the rod end of the shear motor 18 to retract the shear motor. Fluid leaving the shear motor passes through the bypass line 48 and check valve 49 to thus bypass the sequence valve.

From the above it will be seen that a timber harvesting apparatus has been provided which will insure that a tree is felled in a desired direction. By first pressurizing the push arm so that the tree is initially placed under stress before it is felled, the tree will always fall across the anvil even though the blade 17 might move through the tree at such speed that the bevel on the blade would be ineffective to tilt the tree and force it to fall across the anvil.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. Timber-harvesting apparatus comprising,
   a fell shear having an anvil and a hinge-mounted blade for cooperation with the anvil for felling trees,
   a hydraulic motor for swinging said blade,
   a push arm hinge mounted on the fell shear and extending upwardly from the shear and movable in a plane normal to the plane of said anvil,
   said arm having a striking section for engaging a tree extending through the fell shear,
   a hydraulic motor for swinging said push arm,
   and control means for pressurizing said hydraulic motors to simultaneously push a tree toward said anvil and move said blade through the tree to fell the tree in a plane normal to the plane of said anvil.

2. Timber-harvesting apparatus comprising,
   a fell shear having an anvil and a hinge-mounted blade for cooperation with the anvil for felling trees,
   a hydraulic motor for swinging said blade,
   a push arm hinge mounted on the fell shear and extending upwardly from the shear and movable in a plane normal to the plane of said anvil,
   said arm having a striking section for engaging a tree extending through the fell shear,
   a hydraulic motor for swinging said push arm,
   and control means for first pressurizing said push arm motor with a selected pressure and then pressurizing both motors to push said tree toward said anvil and move said blade through the tree to fell the tree in a plane normal to the plane of said anvil.

3. The apparatus of claim 2, wherein the control means includes a sequence valve for first pressurizing the push arm motor and then pressurizing both motors.

* * * * *